March 25, 1941.  H. W. HAPMAN  2,235,991
SPROCKET WHEEL FOR CHAIN CONVEYERS AND THE LIKE
Filed Nov. 8, 1939  2 Sheets-Sheet 1
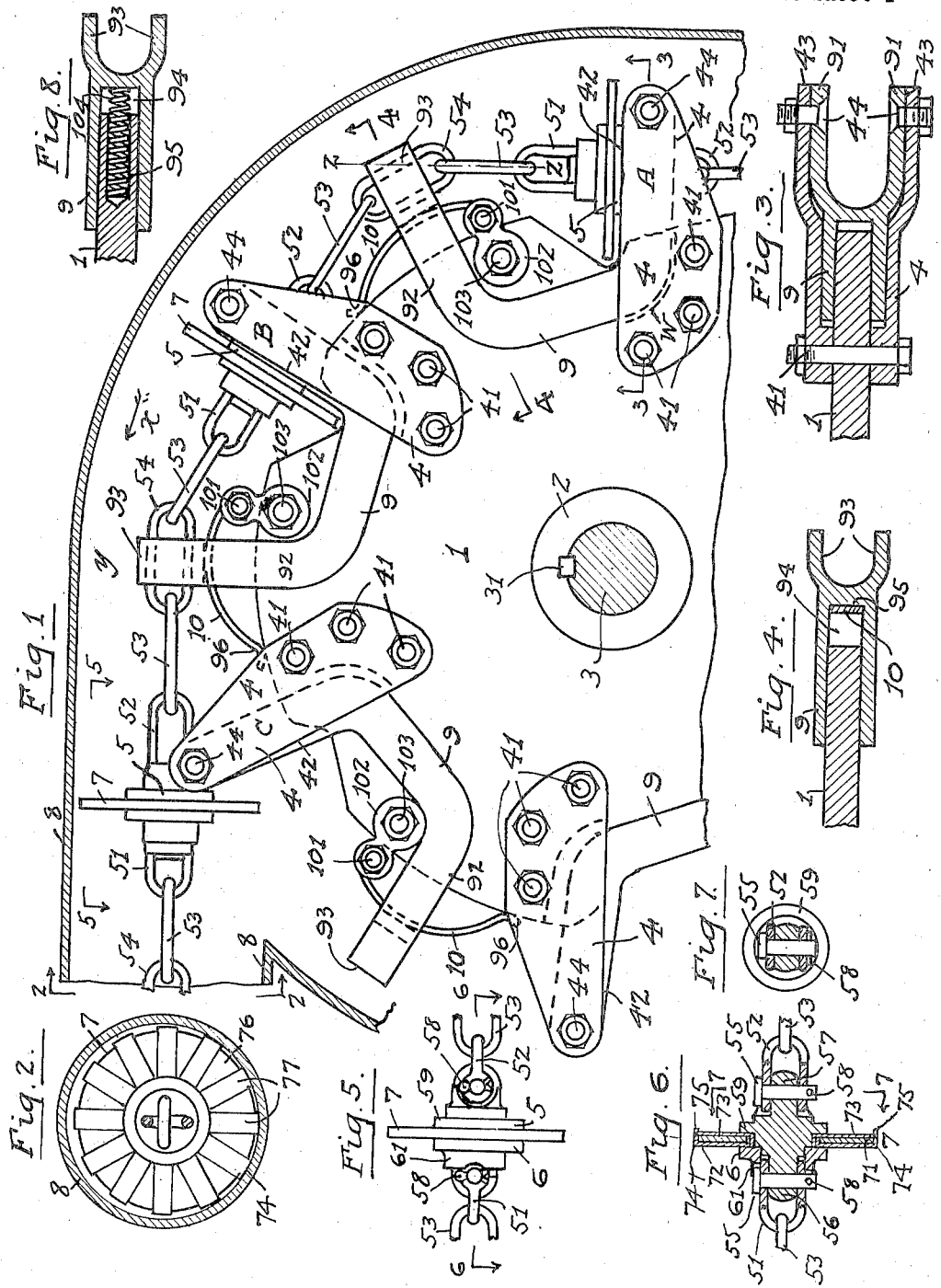
Inventor—
Henry W. Hapman

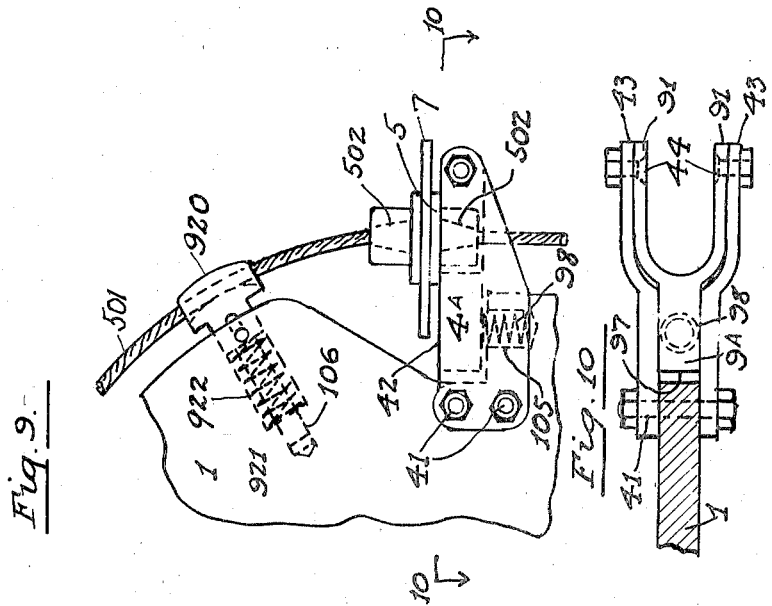

Patented Mar. 25, 1941

2,235,991

UNITED STATES PATENT OFFICE 2,235,991

SPROCKET WHEEL FOR CHAIN CONVEYERS AND THE LIKE

Henry W. Hapman, Detroit, Mich.

Application November 8, 1939, Serial No. 303,381

3 Claims. (Cl. 198—168)

My invention relates to an improved sprocket wheel for chain conveyers and the like, and its principal object is to provide a driving sprocket having resilient means intermediate the teeth by which slack and inaccuracy in the propelling chain, due to wear of the driving elements and other causes, is automatically taken up.

Another object of my said invention is to provide means whereby release of the driving elements of the chain from the sprocket teeth is greatly facilitated, so as to avoid the intense grinding effect between the co-acting surfaces which is produced with chains and sprockets of ordinary construction.

With these and other objects in view, I will now describe a preferred embodiment of my invention as applied to a chain conveyer of the type described in my co-pending United States application, Serial No. 221,697, filed July 28, 1938, since issued as Patent No. 2,178,341, and dated October 31, 1939. In this description reference will be had to to accompanying drawings, forming part of the co-pending application aforesaid, in which—

Figure 1 is a fragmentary elevational view showing the driving sprocket together with a portion of the propelling chain and the associated flight members.

Figure 2 is a transverse section taken on line 2—2 of Figure 1 showing the casing and one of the flight members.

Figure 3 is a section taken on line 3—3 of Figure 1 illustrating the construction of the teeth or propelling members of the sprocket.

Figure 4 is a section taken on line 4—4 of Figure 1 showing the resilient means for taking up slack in the propelling chain and assisting its release from the sprocket.

Figure 5 is a plan view taken on line 5—5 of Figure 1 showing the construction of the flight-carrying member and the shackles for connecting it to the chain links.

Figure 6 is a longitudinal section taken on line 6—6 of Figure 5.

Figure 7 is a transverse section taken on line 7—7 of Figure 6, and

Figure 8 is a fragmentary sectional view corresponding to Figure 4 illustrating a modification of the resilient means for taking up slack of the propelling chain.

Figures 9 and 10 illustrate a modification.

Like characters designate corresponding parts throughout the several views.

In the drawings 1 designates a flat disc, of cast iron or other suitable material, having a central hub 2 which is secured in driving relation with the shaft 3 as by the key 31, the shaft 3 constituting the drive shaft of the conveyer and receiving power through any suitable form of reduction gearing, not shown, by which rotation of the said disc is obtained in the direction indicated by the arrow $x$ in Figure 1. Secured to the disc 1 by bolts 41 are the driving teeth 4, in the present example six in number, which are arranged in equally spaced relation around the shaft 3 and have their forward faces 42 extending in a radial direction and have their ends bifurcated as indicated at 43 in Figure 3 so as to embrace the flight carriers 5, to be hereinafter described.

The propelling chain of the conveyer consists essentially of a series of flight carriers 5 which are provided with fore and aft shackles designated 51 and 52, respectively, and a series of intermediate links 53, 54 of ordinary oval or "coil" construction, the various elements being so proportioned that the distance between the flight carriers 5 corresponds substantially with the pitch of the sprocket teeth 4. The shackles 51, 52 are connected to the flight carriers 5 by pins 55 which engage lugs 56, 57 upon the carriers and are maintained in position by cotter pins 58, as shown clearly in the sectional view, Figure 6. Upon the carriers 5 are flanges 59 and in parallel spaced relation with these flanges are the collars 6, and between the said flanges and the collars are loosely held the flights 7. The flights 7 consist essentially of central discs 71 formed of fiber, rubber, or other soft material which are positioned between forward and rear discs 72, 73, respectively, the said discs being preferably of spring steel and having upon their inner peripheries complementary flanges arranged in telescopic relation, and upon their outer peripheries rearwardly extending flanges 74, 75. The flights are so proportioned that their inner peripheries fit loosely upon the co-acting peripheries of the carriers 5 and have also a slight amount of play in a longitudinal direction between the flanges 59 and the collars 6 so that the said flights may rotate freely about the axes of the carriers. The outer peripheral flanges 74, 75 are so proportioned as to have considerable play within the tubular casing 8 of the conveyer so as to facilitate rotational movement above referred to and also provide such clearance as will prevent jamming of the flights within the casing due to the choking action of the material to be conveyed.

The members 72, 73 which are above described as discs are preferably provided with a series of V-shaped notches 76 so as to constitute in fact a series of resilient radial arms 77 between which the central core 71 is confined, by which construction is provided a very flexible form of flight which is well adapted for rough usage and irregular stresses due to passing of the flights around curves, and so forth, while due to the fact that the flights 7 as a whole are free to rotate about the carriers 5, the wear upon the internal periphery of the casing 8 is well distributed and the formation of ridges therein by the ends of the radial arms 77 is entirely prevented. It will be observed that the hubs 61 of the flanges 6 are each notched to receive on one side the heads of the pins 55 and on the other side to similarly receive the tails of the said pins, by which arrangement the flanges 6 are maintained in proper position and at the same time may be quickly and easily removed by taking out the pins 55, as will be understood.

I will now describe the novel and effective means by which wear and stretch of the propelling chain and consequent inaccuracy of the pitch thereof is compensated for. Between the bifurcated extremities 43 of the driving teeth 4, as by the countersunk bolts 44, are secured the substantially U-shaped members 9, the outer ends of which are correspondingly bifurcated as indicated at 91, so as to provide for the passage therewithin of the flight carriers 5, as shown in Figure 3. The ends of the members 9 remote from their pivotal points extend in a radial direction as indicated at 92 and terminate in forks 93 which are adapted to engage the oval chain links 54 positioned intermediate the carriers. The members 9 are provided with a central opening 94 which embraces the flat sides of the disc 1, and between the said disc and the opposed face 95 of the said member is the leaf spring 10, one end of which is pivoted at 101 to a pair of shackles 102, secured to the disc by bolts 103, while the other end 96 abuts upon the outer periphery of the disc, the result being that the links 54 are yieldingly pressed outwards from the center of the sprocket and serve to take up any slack in the chain and at the same time assist in the disengagement of the members 5 from the sprocket teeth 4 when they arrive at the point y as indicated in Figure 1.

In order to make clear the action of the springs 10, it will be seen from the drawings, Figure 1, that the working face 42 of the sprocket tooth 4 on the extreme right hand, designated A, is in alignment with the adjacent inner face of the U-shaped member 9, while it will be seen by observing the sprocket tooth B that the inner face of the last-named member is slightly above the inner face 42 of the tooth, while in the case of the sprocket tooth C the inner face of the U-shaped member is still further removed from the said inner face 42. This movement of the U-shaped members in relation to the sprocket teeth obviously exerts a very powerful leverage tending to remove the flange 59 of the flight carrier 5 away from the tooth 4 so that the two parts are easily disengaged as the flight advances towards the point Y in the Figure 1. It will be observed further that since the pressure along the radial arm 92 of the member 9 is proportionate to the sine of the angle between it and the tangential line Z—Z of the propelling chain, the force which must be exerted by the spring 10 is relatively small in relation to the pull upon the driving chain. In order to limit the swinging movement of the member 9 around its pivot 44 and prevent such movement from becoming excessive due to centrifugal force, the said member in its outer movement abuts upon the external periphery of the shackles 102, as shown to the left hand side of Figure 1. Inward movement of the member 9 is prohibited by the contact of its outer surface against the inner surface of the cavity W in the member 4, as will be seen on reference to the right hand tooth of the sprocket.

In Figure 8 of the drawings, I have shown a modification of the design in which a helical compression spring 104 is substituted for the leaf spring 10, the said spring being positioned within a circular cavity 95 in the member 9.

While I have herein described and shown a preferred embodiment of my invention, it will be readily understood by those skilled in the art to which the same relates that various changes in detail may be made to suit particular requirements without departing from the spirit of my invention as defined in the appended claims. For example, while I have herein described my improved sprocket wheel as applied to a conveyer in which the flight-propelling element is made up from chain links, obviously it may be used with equal advantage in cases where the flights are mounted at spaced intervals upon a wire rope.

Such an application is illustrated in Figures 9 and 10 of the drawings, in which Figure 9 is a fragmentary elevational view corresponding to Figure 1, and Figure 10 is a horizontal section taken on line 10—10 of Figure 9.

In this modification, the driving tooth 4A is secured to the disc 1 by two bolts only, designated 41, while the member 9A, pivoted at 44 to the bifurcated end of the member 4A, is cut off, as indicated at 97. At 105 in the member 1 is a cavity in which is positioned a helical spring 98 adapted to urge the member 9A upwardly away from the forward face 42 of the member 4A. The propelling member 501 is built up from sections of wire rope connected to the flight carriers 5 by any usual means such as the tapered fitting 502 shown, and intermediate the members 4A are the guide members 920 having shanks 921 slidably mounted within openings 106 in the member 1 and urged outwardly by the helical spring 922. In this modification the member 9A is urged upwardly by the spring 98, while the member 920, for taking up the slack of the rope, has a separate spring 922. The separate members 9A and 920 take the place of the member 9 in Figures 1 to 8, and perform the same functions. Thus the mechanism for urging the flight carriers away from the working faces of the driving members 4A is separate from the means employed for taking up slack of the propelling rope.

Having thus described my said invention, what I claim and desire to secure by Letters Patent of the United States is:

1. In a device of the character described, the combination, with a flexible propelling chain consisting of a series of flights having driving flanges and connected in spaced relation by intermediate links, of a driving sprocket comprising a disc having a hub for engaging a power shaft, a plurality of driving members disposed around the periphery of said disc and having their forward faces radial and their ends bifurcated to receive the propelling chain, substantially U-shaped levers pivoted to the ends of said driving members and having adjacent their pivots bifurcated faces normally engaging said driving flanges and having their free ends positioned intermediate said driving members and adapted to engage said intermediate links, and resilient means urging said free ends outwardly to take up slack in said chain.

2. In a conveyer of the character described, the combination, with a flexible propelling chain consisting of a series of flights having driving flanges and connected in spaced relation by intermediate links, of a driving sprocket comprising a disc having a hub for engaging a power shaft, a plurality of driving members disposed around the periphery of said disc and having their forward faces radial and their ends bifurcated to receive the propelling chain, substantially U-shaped levers pivoted to the ends of said driving members and having adjacent their pivots bifurcated faces normally engaging said driving flanges and having their free ends positioned intermediate said driving members and adapted to engage said intermediate links, and resilient means urging said free ends outwardly to take up slack in said chain and to facilitate disengagement of said flanges from said faces.

3. In a device of the character described, the combination, with a flexible propelling member having a series of flight carriers and flights arranged in spaced relation, of a sprocket having a plurality of main driving members disposed around its periphery and having radial faces adapted to engage said flight carriers, and a series of auxiliary driving members pivoted to the ends of said main driving members and provided with resilient means for yieldingly urging said auxiliary members away from said main members to facilitate disengagement of said flight carriers.

HENRY W. HAPMAN.